H. E. SHELLER.
AUTOMOBILE STEERING WHEEL.
APPLICATION FILED AUG. 7, 1918.

1,324,697.

Patented Dec. 9, 1919.
2 SHEETS—SHEET 1.

Inventor
Harry E. Sheller
By C. W. Parker
Attorney

H. E. SHELLER.
AUTOMOBILE STEERING WHEEL.
APPLICATION FILED AUG. 7, 1918.

1,324,697.

Patented Dec. 9, 1919.
2 SHEETS—SHEET 2.

Inventor
Harry E. Sheller
By C. L. Parker
Attorney

UNITED STATES PATENT OFFICE.

HARRY E. SHELLER, OF PORTLAND, INDIANA.

AUTOMOBILE STEERING-WHEEL.

1,324,697.  Specification of Letters Patent.  Patented Dec. 9, 1919.

Application filed August 7, 1918. Serial No. 248,749.

*To all whom it may concern:*

Be it known that I, HARRY E. SHELLER, a citizen of the United States, residing at Portland, in the county of Jay and State of Indiana, have invented certain new and useful Improvements in Automobile Steering-Wheels, of which the following is a specification.

My invention relates to improvements in steering hand-wheels for automobiles and the like.

Important objects of the invention are to provide means for preventing the cutting of large holes in the wooden rim of the wheel, for inserting the arms of the spider, whereby the rim is strengthened and adapted to be painted before connection with the spider thereby saving the labor employed at the present time for hand finishing the rim; increasing the durability of the hand wheel and effecting a more perfect hand fit under and inside the rim, at connections with the arms of the spider; reducing the labor employed in casting the spiders and enabling a larger number of the same to be produced in a given time, with the same size mold box thereby decreasing the cost of production; means for effecting a novel and strong joint between the arms of the spider and rim; means for securely attaching the arms of the spider to the hub thereof.

Other objects and advantages of the invention will be apparent during the course of the following description.

Figures 1, 2:
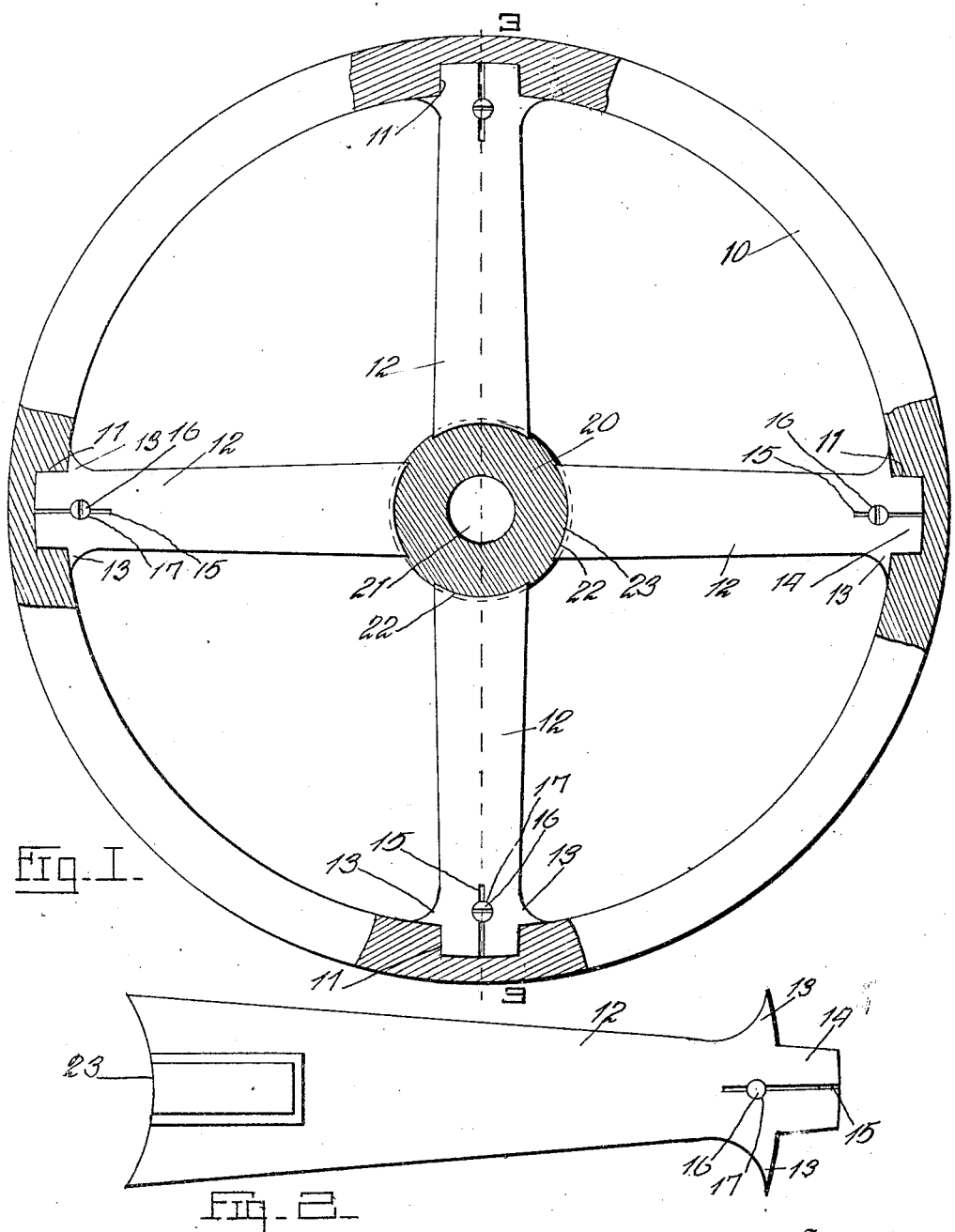
Figure 3:
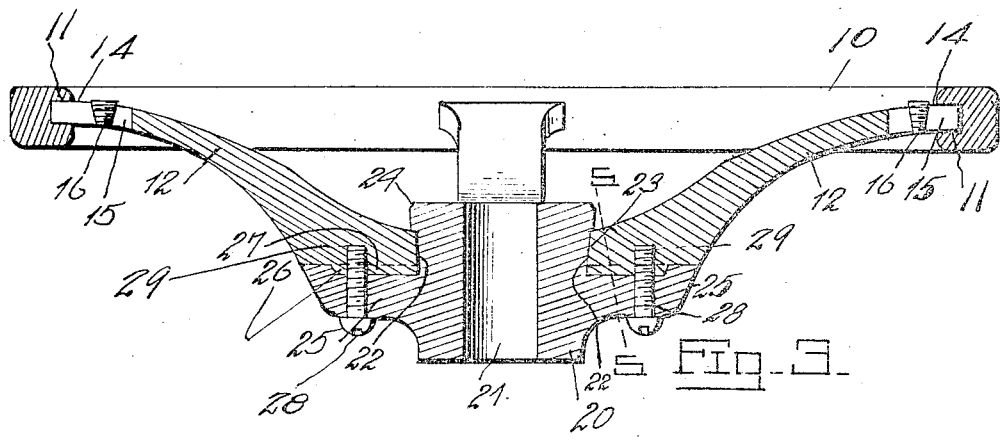
Figure 4:
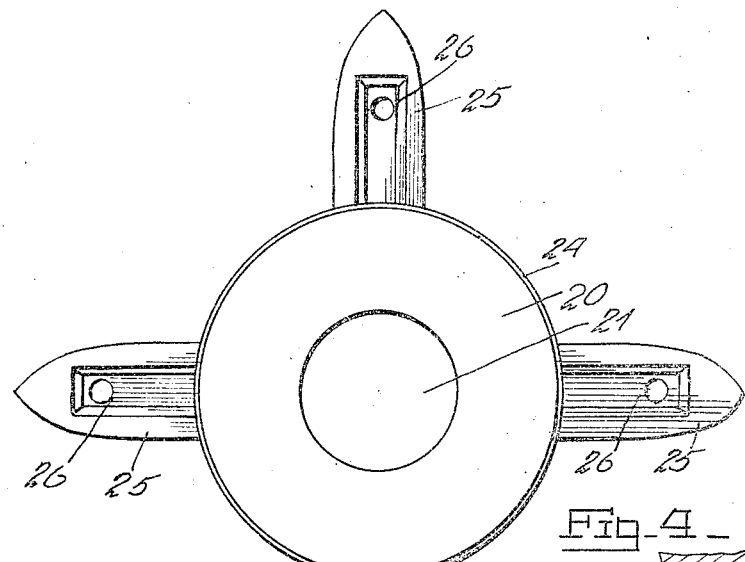
Figure 5:
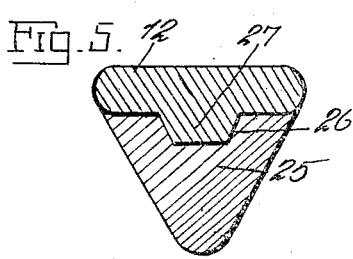
Figure 6:
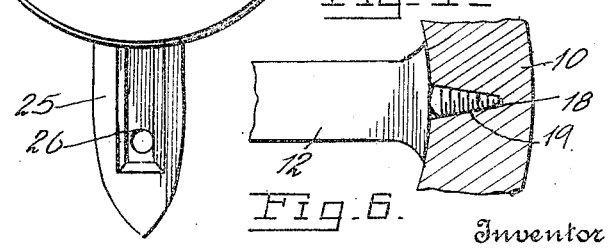

In the accompanying drawings forming a part of this specification and in which like numerals are employed to designate like parts throughout the same, Figure 1 is a plan view of a hand steering wheel embodying my invention, parts being shown in horizontal section, Fig. 2 is a bottom plan view of one arm of the spider, Fig. 3 is a transverse sectional view taken on line 3—3 of Fig. 1, Fig. 4 is a plan view of the hub of the spider, Fig. 5 is a transverse sectional view taken on line 5—5 of Fig. 3, and, Fig. 6 is a detail section showing a slightly different form of connection between the spider arm and rim.

In the drawings, wherein for the purpose of illustration is shown a preferred embodiment of my invention, the numeral 10 designates a rim, which may be formed of wood, metal, or any other suitable material. This rim possesses a slight degree of resiliency. As more clearly shown in Figs. 1 and 3, the rim 10 is provided preferably at diametrically opposite points with inclosed recesses 11, four of these recesses being shown, but it is to be understood that the invention is in no sense restricted to this precise number. The recesses 11 are horizontal and are cut through the inner side or face of the rim and do not pass through the upper and lower faces thereof, as clearly shown in Fig. 3.

The spider comprises arms 12, preferably formed of metal, and corresponding in number to the recesses 11. As shown in Figs. 1, 2 and 3, the arms 12 are provided with shoulders 13 and extensions 14, having longitudinal slots or slits 15 formed therein. The extensions 14 project into the recesses 11. The extensions 14 are clamped within the recesses 11 by tapered expanding screws 16, having screw-threaded engagement within openings 17.

In Fig. 4, I have shown a different form of connection between the arm 12 of the spider and the rim 10. In this figure, the arm is equipped with a screw-threaded cylindrical extension 18, entering a screw-threaded opening 19, formed in the rim 10, as shown.

Arranged at and between the inner ends of the arms 12 is a hub 20, which is cylindrical and has an opening 21, for the reception of the steering rod or column. The hub 20 is provided upon its periphery, near and beneath its upper end, with a number of inclosed recesses 22, corresponding in number and arrangement to the arms 12. These recesses do not extend through the upper or lower ends of the hub. These recesses are comparatively shallow and may only be from one-sixteenth to one-eighth of an inch deep while this depth may be widely varied. The recesses serve to receive the inner transversely curved ends 23 of the arms 12, which are sprung therein. The upper end of the hub 20 is tapered or beveled, as shown at 24, for aiding in springing the arms 12 into the recesses 22. Arranged beneath the arms 12 are attaching members or brackets 25, corresponding in number and arrangement to the arms. These attaching members are preferably formed integral with the hub 20. As clearly shown in Fig. 5, each attaching member 25 is provided upon its upper surface with a radial groove 26, receiving a depending radial lug or rib 27, formed upon the arm 12. Screws or bolts 28, are provided, having screw-threaded engagement within openings 29, formed in the arms 12.

In assembling the hand wheel, the outer ends of all the arms 12 are inserted within the recesses 11, the inner end of two adjacent arms are inserted within the recesses 22, the other arms are then forced downwardly over the beveled or tapered end 24 and are sprung into the recesses 22. This is possible by virtue of the fact that the rim 10 and the arm 12 are slightly resilient. When this is done, the tongues 27 of the arms 12 fit within the grooves 26 and the bolts or screws are then put in place.

This hand wheel may also be assembled by inserting the outer ends of all the arms 12 within the recesses 11 of the rim 10; by then forcing the inner ends of all the arms 12 downward over the beveled or tapered end 24 and inserting the inner end of the arms 12 into the recesses 22. This is possible by virtue of the fact that the rim 10 and the arms 12 are slightly resilient. When this is done the tongues 27 of the arms 12 fit within the grooves 26 and the bolts or screws are then put in place.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A steering hand-wheel comprising a slightly resilient continuous rim being free from separable joints and provided upon its inner side with inclosed recesses which are open upon their inner side only, a plurality of arms each of which is relatively rigid having their outer ends projecting into the inclosed recesses, a hub provided upon its periphery with inclosed recesses which are open upon their outer sides only so that such recesses have upper and lower walls spaced from the ends of the hub, the inner ends of certain of the arms being adapted to spring into certain of the recesses of the hub when such arms are forced longitudinally of the hub in contact therewith, and separate means for connecting the inner ends of the arms with the hub.

2. A steering hand-wheel comprising a continuous rim being free from separable joints and provided upon its inner side with inclosed recesses which are open upon their inner side only, a plurality of radial arms each of which is integral and having their outer ends projecting into the inclosed recesses, a hub provided upon its periphery with inclosed recesses which are open upon their outer sides only so that such recesses have upper and lower walls spaced from the ends of the hub, the inner ends of the arms being adapted to spring into the recesses of the hub when the hub assumes a proper position between such inner ends, radial brackets secured to the hub, and means for connecting the inner ends of the arms with the radial brackets.

3. A steering hand-wheel comprising a continuous rim being free from separable joints and provided upon its inner side with inclosed recesses which are open upon their inner side only, a plurality of radial arms each of which is integral and having their outer ends projecting into the inclosed recesses, a hub provided upon its periphery with inclosed recesses which are open upon their outer sides only so that such recesses have upper and lower walls spaced from the ends of the hub, said hub having one end thereof tapered so that the hub may be arranged in a proper position between the inner ends of the arms and such inner ends enter the inclosed recesses of the hub, brackets carried by the hub and arranged upon the opposite sides of the recesses remote from the tapered end of the hub, and elements securing the inner ends of the arms to the brackets.

4. A steering hand-wheel comprising a rim provided upon its inner side with inclosed recesses, a plurality of arms having extensions projecting into the inclosed recesses, longitudinal depending ribs carried by the arms near their inner ends, a hub provided upon its periphery with inclosed recesses for the reception of the inner ends of the arms, brackets rigidly secured to the hub and arranged beneath the inner ends of the arms and having grooves to receive the ribs, and connecting means between the arms and the brackets.

5. A steering hand-wheel comprising a rim provided upon its inner side with inclosed recesses, a plurality of arms having longitudinally split extensions projecting into the inclosed recesses, means for expanding the longitudinally split extensions, a hub provided upon its periphery with inclosed recesses for receiving the inner ends of the arms, and brackets rigidly secured to the hub and having interlocking engagement with the inner portions of the arms.

In testimony whereof I affix my signature in presence of two witnesses.

HARRY E. SHELLER.

Witnesses:
 PAUL C. JAQUES,
 LEE TEAGUE.